UNITED STATES PATENT OFFICE.

CHARLES S. VADNER, OF BUTTE, MONTANA.

PROCESS FOR THE RECOVERY OF METALS FROM ORES AND THE LIKE.

1,231,101.

Specification of Letters Patent.  Patented June 26, 1917.

No Drawing.   Application filed November 18, 1916.   Serial No. 132,209.

*To all whom it may concern:*

Be it known that I, CHARLES S. VADNER, a citizen of the United States, and a resident of Butte city, Silverbow county, Montana, have discovered a new and useful Process for the Recovery of Metals from Ores and the like, of which the following is a specification.

Oxids, carbonates or sufficiently roasted sulfid ores are ground to the proper size and showered or sprayed in water down through the first of a series of solution towers. These towers are of suitable size and height according to the quantity of ore to be treated and the length of time the ore requires to be exposed. The sulfurous fumes are led into these solution towers and mingled with the sprayed ore pulp. By means of this spraying, every particle of ore is subjected to the action of the sulfurous gases, which, in the presence of water, effects the solution of the copper and zinc, some of the iron and arsenic and other metals contained as aforesaid in the ore.

The residues can be treated by a saturated solution of a soluble chlorid, preferably salt, the lead and silver will be extracted, and possibly some of the gold. The insoluble residue is eliminated and the pregnant solution is passed over metals such as zinc and iron, preferably iron, the metals, chiefly lead and silver, being recovered in metallic form. The undissolved portion of the above mineral matter should be washed free from the original solvent before treatment with the saline solution.

I would not desire to limit myself to merely the use of sodium chlorid, but would use one or more, either separately or in combination, of the common soluble chlorids, such as those of magnesium, calcium, manganese, iron and copper. The recovery of the lead from such a chlorid solution can be hastened by a current of electricity applied in the ordinary manner. In recovering lead from a saline solution by means of iron, the recovery of the lead is greater by using electricity in connection with the displacement of the lead from the solution by means of iron, said iron being introduced into the solution in the dual capacity of a displacing agent and an electrode, connections being made as in any electrical installation wherein copper or other metals are being recovered, the voltage of the current being maintained at such a pressure that the current acts as an aid or hastener of the deposition in conjunction with that of the iron that is already engaged in depositing lead, the current used being insufficient to produce any decomposition otherwise than that effected by the iron, namely that of depositing metallic lead. The insoluble salts of iron that are produced are recovered; likewise the soluble zinc salts in case the lead is recovered by the use of zinc. The $SO_2$ pregnant solution in some cases will not be free from lead and other metals, but if the solution is freed from acidity and oxidized with a suitable oxidizing agent the lead can practically be all precipitated on to the insoluble residue and recovered as aforementioned. The reduction of acidity and oxidization may be effected by means of air, by passing the solution over mineral matter and the like and by manganese compounds that can produce such an effect, such as $MnO_2$ and others. In effecting the reduction of acidity of the solution, same is passed over into a tank containing manganese ore and agitated in any convenient manner, with or without heat until the desired reaction takes place, in using manganese compounds in a higher state than the manganous condition, oxidation of the above pregnant solution is also promoted. The above means can be used separately, in part, or in combination as may be for the purpose mentioned. The lead, iron and zinc can be recovered in the form of metal and insoluble salts, as mentioned before. The pregnant solution above mentioned after the elimination of the lead therefrom can be treated for the elimination and recovery of other metals. The original pregnant solution while being freed of lead as above mentioned is also freed of iron, a procedure which is necessary in the subsequent recovery of the metals that may be found in the original pregnant solution from which the lead has been eliminated. In case the precipitation of the iron is not quite complete air and the oxid or carbonate of a metal can be used to complete same.

Having described my invention, what I desire to secure by Letters-Patent is:—

1. In the art of recovering metals from naturally oxidized or sufficiently roasted sulfid ores, the method which consists in treating the sufficiently ground ore with sulfurous fumes in the presence of moisture eliminating any excess acidity of solution and dissolving the lead from the insoluble residue by treating same with a saturated solution of the chlorid of a metal that will dissolve the lead.

2. In the art of recovering metals from naturally oxidized or sufficiently roasted sulfid ores, the method which consists in treating the sufficiently ground ore with sulfurous fumes in the presence of moisture eliminating any excess acidity of solution, dissolving the lead from the insoluble residue by treating same with a saturated solution of sodium chlorid and recovering the lead from the salt solution by treating same with iron.

3. In the art of recovering metals from naturally oxidized or sufficiently roasted sulfid ores, the method which consists in treating the sufficiently ground ore with sulfurous fumes in the presence of moisture, compound of lead soluble in an excess of $SO_2$ and water but insoluble in the absence of said $SO_2$ and water, and soluble however in a saturated solution of sodium chlorid, eliminating any excess acidity of solution, dissolving the lead from the insoluble residue by treating same with a saturated solution of sodium chlorid and electrolyzing the solution with iron anodes for the recovery of lead.

4. In the art of recovering metals from naturally oxidized or sufficiently roasted sulfid ores, the method which consists in treating the sufficiently ground ore with sulfurous fumes in the presence of moisture, compound of lead soluble in an excess of $SO_2$ and water but insoluble in the absence of said $SO_2$ and water, and soluble however in a saturated solution of sodium chlorid, eliminating by oxidation unnecessary excess acidity of solution, suitably separating the solution from the insoluble residue, treating the insoluble residue with a saturated solution of salt thereby dissolving the lead and electrolyzing the solution with soluble anodes whereby the lead is recovered.

5. In the art of recovering metals from naturally oxidized or sufficiently roasted sulfid ores, the method which consists in treating the sufficiently ground ore with sulfurous fumes in the presence of sufficient moisture, oxidizing the solution by means of mineral matter and the like containing an oxygen compound of manganese that can oxidize the solution, thereby precipitating any lead that may be in solution on to the insoluble portion of the ore, separating the insoluble residue from the solution, treating said residue with a saturated solution of salt thereby dissolving the lead, passing the saturated salt solution containing the lead over iron whereby the lead is recovered.

6. In the art of recovering metals from naturally oxidized or sufficiently roasted sulfid ores, the method which consists in treating the sufficiently ground ore with sulfurous fumes in the presence of sufficient moisture, oxidizing the solution by means of mineral matter and the like containing an oxygen compound of manganese that can oxidize the solution, thereby precipitating any lead that may be in solution on to the insoluble portion of the ore, separating the insoluble residue from the solution, treating said residue with a saturated solution of salt thereby dissolving the lead, passing the saturated salt solution containing the lead over iron in the presence of a current of electricity and recovering the lead.

7. In the art of recovering metals from naturally oxidized or sufficiently roasted sulfid ores, the method which consists in treating the sufficiently ground ore with sulfurous fumes in the presence of moisture, eliminating unnecessary excess acidity of solution, suitably separating the solution from the insoluble residue, treating the insoluble residue with a saturated solution of salt thereby dissolving the lead precipitating same by passage over iron in the presence of a current of electricity and recovering the iron precipitated in the form of an insoluble salt.

8. In the art of recovering metals from naturally oxidized or sufficiently roasted sulfid ores, the method which consists in treating the sufficiently ground ore with sulfurous fumes in the presence of sufficient moisture, compound of lead soluble in an excess of $SO_2$ and water but insoluble in the absence of said $SO_2$ and water, and soluble however in a saturated solution of sodium chlorid, oxidizing the solution by means of mineral matter and the like containing an oxygen compound of manganese that can oxidize the solution, separating the solution from the insoluble residue, precipitating the lead by means of iron in the presence of a current of electricity and recovering the iron in the form of an insoluble salt.

9. In the art of recovering metals from naturally oxidized or sufficiently roasted sulfid ores, the method which consists in treating the sufficiently ground ore with sulfurous fumes in the presence of moisture eliminating any excess of acidity of solution and dissolving the lead from the insoluble residue by treating same with a saturated solution of the chlorid of a metal that will dissolve the lead, eliminating the precipitated lead, precipitating the zinc by means of the hydrate of a metal that will precipitate same and eliminating and recovering the zinc so precipitated.

10. In the art of recovering metals from naturally oxidized or sufficiently roasted sulfid ores, the method which consists in treating the sufficiently ground ore with sulfurous fumes in the presence of a sufficiency of moisture, eliminating unnecessary acidity of solution by passing same over mineral matter and the like containing an oxygen compound of manganese that can oxidize the solution thereby precipitating any lead that may be in solution on to the insoluble portion of the ore, eliminating the said insoluble portion of the ore containing the lead and recovering the metals from the separated solution.

In witness whereof, I have hereunto set my hand in the presence of two subscribing witnesses.

CHARLES S. VADNER.

Witnesses:
 DONNA MARGETTS,
 MURRAY SHEPHERD.